United States Patent
Kobayashi et al.

(10) Patent No.: US 8,961,209 B2
(45) Date of Patent: Feb. 24, 2015

(54) CELL-VOLTAGE DETECTION CONNECTOR

(75) Inventors: Masaki Kobayashi, Makinohara (JP); Kimiharu Mizusaki, Wako (JP); Yoshiyuki Kobayashi, Wako (JP); Toshiaki Ariyoshi, Wako (JP)

(73) Assignees: Yazaki Corporation, Tokyo (JP); Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 13/814,579

(22) PCT Filed: Sep. 26, 2011

(86) PCT No.: PCT/JP2011/071908
§ 371 (c)(1),
(2), (4) Date: Feb. 6, 2013

(87) PCT Pub. No.: WO2012/043486
PCT Pub. Date: Apr. 5, 2012

(65) Prior Publication Data
US 2013/0143446 A1  Jun. 6, 2013

(30) Foreign Application Priority Data

Sep. 27, 2010  (JP) .................................. 2010-215290

(51) Int. Cl.
*H01R 13/64* (2006.01)
*H01R 13/641* (2006.01)
(Continued)

(52) U.S. Cl.
CPC .......... *H01R 13/641* (2013.01); *H01R 13/6315* (2013.01); *H01M 2/305* (2013.01); *H01M 2/206* (2013.01); *H01R 13/415* (2013.01); *H01M 2220/20* (2013.01); *H01R 12/91* (2013.01)

USPC .......................................... 439/264; 439/378

(58) Field of Classification Search
USPC ........................................ 439/246, 378, 374
See application file for complete search history.

(56) References Cited

U.S. PATENT DOCUMENTS 2,972,728 A * 2/1961 Cole .............................. 439/246
3,295,097 A * 12/1966 Horssen et al. ............... 439/746

(Continued)

FOREIGN PATENT DOCUMENTS

| CN | 101375446 A | 2/2009 |
|---|---|---|
| JP | 594967 U | 12/1993 |

(Continued)

OTHER PUBLICATIONS

International Search Report (PCT/ISA/210) dated Dec. 20, 2011 issued by the International Searching Authority in counterpart International Application No. PCT/JP2011/071908.

(Continued)

*Primary Examiner* — Gary Paumen
(74) *Attorney, Agent, or Firm* — Sughrue Mion, PLLC (57) ABSTRACT

To provide a technique by which an accumulated tolerance caused by the arrangement of terminal fittings is eliminated to improve the workability in a multipole cell-voltage detection connector. When all of receptacle terminals (94) are inserted into receptacle insertion groove parts (22), each of the receptacle terminals (94) is buckled at a bending hole (97) and a mark-off part (98) formed as a boundary of a receptacle root part (95) and a receptacle front part (96). Because the receptacle insertion groove parts (22) are formed in a state where there is substantially no tolerance, the terminal pitch tolerance correction housing (10) is fitted to receptacle units (90), and the receptacle terminals (94) (receptacle front parts (96)) protruded from the receptacle insertion groove parts (22) toward a bottom inner surface (15) are corrected to a state where there is no tolerance.

7 Claims, 11 Drawing Sheets (51) Int. Cl.
   *H01R 13/631* (2006.01)
   *H01M 2/30* (2006.01)
   *H01M 2/20* (2006.01)
   *H01R 13/415* (2006.01)
   *H01R 12/91* (2011.01)

(56) References Cited

U.S. PATENT DOCUMENTS

| | | | | |
|---|---|---|---|---|
| 3,864,000 | A * | 2/1975 | Coller et al. | 439/246 |
| 4,842,536 | A * | 6/1989 | Meyrat et al. | 439/246 |
| 5,779,491 | A | 7/1998 | Nagano et al. | |
| 6,155,856 | A * | 12/2000 | Sanada | 439/246 |
| 6,517,359 | B1 * | 2/2003 | Felps et al. | 439/63 |
| 6,674,264 | B2 | 1/2004 | Sato et al. | |
| 6,997,727 | B1 * | 2/2006 | Legrady et al. | 439/246 |
| 7,080,999 | B2 * | 7/2006 | Narui et al. | 439/246 |
| 7,704,088 | B2 * | 4/2010 | Sakamoto | 439/246 |
| 2002/0164517 | A1 | 11/2002 | Sato et al. | |
| 2002/0197898 | A1 * | 12/2002 | Kim | 439/246 |
| 2003/0048091 | A1 | 3/2003 | Sato et al. | |
| 2003/0176094 | A1 * | 9/2003 | Myer et al. | 439/246 |
| 2005/0037650 | A1 * | 2/2005 | Hsu et al. | 439/246 |
| 2005/0142417 | A1 | 6/2005 | Sato et al. | |
| 2006/0084295 | A1 | 4/2006 | Laub et al. | |
| 2009/0136822 | A1 | 5/2009 | Aoto | |

FOREIGN PATENT DOCUMENTS

| | | |
|---|---|---|
| JP | 631092 U | 4/1994 |
| JP | 08-078096 A | 3/1996 |
| JP | 2002-367649 A | 12/2002 |
| JP | 200386219 A | 3/2003 |
| JP | 2003-257518 A | 9/2003 |
| JP | 2004127777 A | 4/2004 |
| JP | 2008-517428 A | 5/2008 |
| WO | 2010/041480 A1 | 4/2010 |

OTHER PUBLICATIONS

Written Opinion (PCT/ISA/237) dated Dec. 20, 2011 issued by the International Searching Authority in counterpart International Application No. PCT/JP2011/071908.

European Search Report dated Feb. 27, 2014 issued by the European Patent Office in counterpart European Patent Application No. 11829040.2.

Office Action dated Sep. 2, 2014, issued by the Japanese Patent Office in counterpart Japanese Application No. 2010-215290.

Office Action, Issued by the State Intellectual Property Office of P.R. China, Dated Nov. 4, 2014, in counterpart Chinese Application No. 201180046630.7.

* cited by examiner

CELL-VOLTAGE DETECTION CONNECTOR

TECHNICAL FIELD

The present invention relates to a cell-voltage detection connector, and more particularly to a cell-voltage detection connector to which male terminals and female terminals having plural poles (plural pins) are connected.

BACKGROUND ART

In general, a variety of connector units (connection connectors) have been used for wiring in automobiles or electric devices. As the above connector units, there has been known a multipole connector unit of the type in which a male terminal connector that accommodates a plurality of male terminals in a housing is fitted to a female terminal connector that accommodates a plurality of female terminals in a housing in correspondence therewith. In the automobiles, a large number of electronic components have been used with highly developed electronic control, and because of this, the above-mentioned connector units have been frequently used.

Further, in recent years, hybrid vehicles have received remarkable attention as automobiles small in environmental load, and have come to exude a strong presence in the market. Further, auto manufacturers have accelerated the development so that electric vehicles become widespread, and particularly technical innovations have been rapidly advanced mainly on mounted batteries. In general, the batteries mounted on the automobiles, which have been frequently used, are of the type in which a large number of cells are stacked one on another. In fuel batteries, there is a need to manage a power generation state of each cell in order to early detect abnormal cells, and to achieve the management, a voltage of each cell is detected.

In order to surely detect the cell-voltages in the fuel battery, there is a technique for insuring a connection state between terminals of a cell-voltage detection device and separators of the fuel battery (for example, refer to Patent Literature 1). In this technique, a plurality of plate-like separators are stacked. An output terminal is so shaped as to configure a part of each separator. Those output terminals are arranged at given intervals in correspondence with the stacked arrangement of the separators. Further, a terminal holder is so disposed as to cover a group of the output terminals in a lump, and have a terminal abutted against the respective output terminals and electrically connected thereto. The terminal holder has a pair of legs arranged across a terminal port, and has an elastic body (cushion) on at least one of tips of the legs and a tip of a head. This configuration makes it possible that the elastic body absorbs vibration. Further, the terminal holder holds one ends of terminals between the pair of legs. This configuration makes it hard to displace the terminal holder even if a load is applied to the terminal holder from a terminal cover, as a result of which the terminals are hard to displace.

Figure 11:
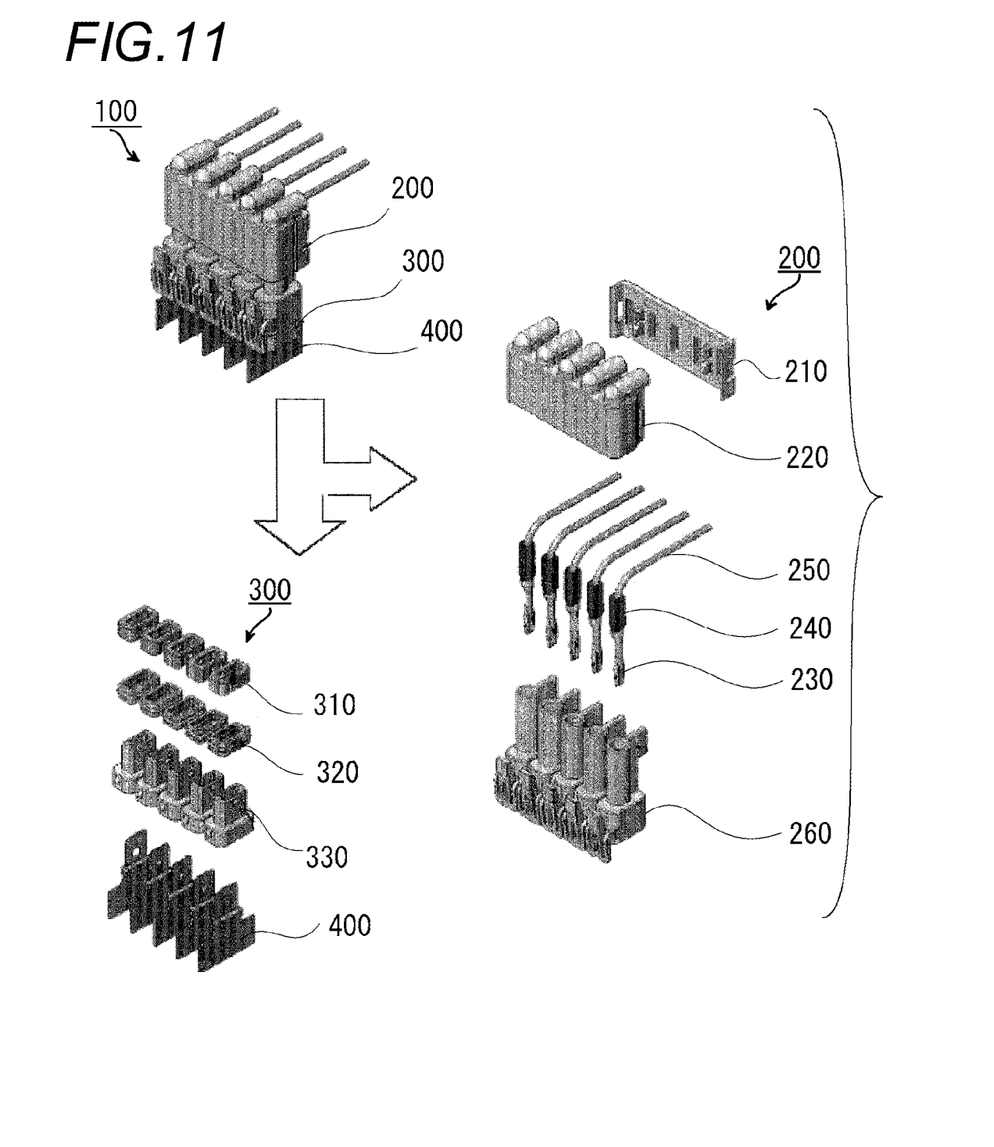
FIG. 11 is a diagram illustrating a connector unit according to a related art.

FIG. 11 illustrates an example of another connector unit 100 used in the fuel battery. The connector unit 100 includes a cell-side connector 300 fitted to a cell V terminal 400, and a plug-side connector 200. When the plug-side connector 200 is assembled, plug terminals 230 each having an electric wire 250 and a wire seal 240 are accommodated into a plug housing 260, and the plug terminals 230 are covered with a plug guide lock 210 and a plug guide housing 220. The cell-side connector 300 includes a cell insulator 330, a fitting seal 320, and a cell front holder 310, and the cell-side connector 300 is attached to the cell V terminal 400.

CITATION LIST

Patent Literature

Patent Literature 1: JP-A-2003-86219

SUMMARY OF INVENTION

Technical Problem

Incidentally, in the above-described Patent Literature 1 and the technique disclosed in FIG. 11, in order to absorb variations in terminal pitch tolerance, which is caused by the number of terminals formed by a plurality of poles, that is, in order to prevent the arrangement of components such as the terminals from becoming inadequate due to an accumulated tolerance so as to make it impossible to accommodate the terminals, the terminals have been inserted and removed one by one. With the execution of the above work, a trouble caused by the tolerance variations can be eliminated. However, the man-hours may be increased and inadequate wiring may occur in assembling. Further, from the viewpoint of downsizing, there is a limit to the above work, and new techniques have been demanded. Also, the number of multi-poles causes the large accumulated tolerance, and there is a possibility that the pitch of the plug-side terminal (plug-side connector 200) and the pitch of receptacle side terminals (cell V terminal 400) are largely displaced from each other. In this case, the plug-side terminals and the receptacle side terminals cannot be fitted to each other. In such a state, if those terminals are forcedly attempted to be fitted to each other, there is a risk that the connector and the peripheral components may be destroyed.

The present invention has been made in view of the above circumstances, and an object thereof is to provide a technique by which the accumulated tolerance caused by the arrangement of terminal fittings is eliminated to improve the workability in a multipole cell-voltage detection connector.

Solution to Problem

The above object of the present invention can be achieved by the following configurations:

(1) A cell-voltage detection connector, including: a female connector in which a plurality of female terminals to be externally connected through respective electric wires are arranged; and a male connector, that is assembled in a cell unit having a plurality of stacked cells, in which plate-shaped terminals protruded from the respective cells are arranged, wherein the male connector and the female connector are fitted to each other to connect the female terminals and the plate-shaped terminals together, the male connector includes a correction mechanism that is configured to deform the plate-shaped terminals to correct an accumulated tolerance caused by stack of the respective cells, and the correction mechanism includes a plurality of through-holes through which the plurality of plate-shaped terminals pass, and guide parts that are formed to be widened toward a side where the plate-shaped terminals are inserted from the respective through-holes.

(2) The cell-voltage detection connector according to the configuration (1), wherein the plate-shaped terminals are disposed so that wide surfaces of the plate-shaped terminals face along a direction of stacking the plurality of cells, and each of the plate-shaped terminals includes a bendable part that can be deformed with bending along the stacking direction.
(3) The cell-voltage detection connector according to the configuration (3), wherein the bendable part includes a hole formed in each wide surface of the plate-shaped terminals.
(4) The cell-voltage detection connector according to any one of the configurations (1) to (3), wherein each of the female connector and the male connector includes a plurality of inner connectors that is divided into units each having a given number of poles, and a holder that accommodates the plurality of inner connectors, and the correction mechanism is provided in each divided inner connector of the male connector.
(5) The cell-voltage detection connector according to any one of the configurations (1) to (3), wherein the male connector and the female connector include an aligning mechanism for positioning a fitting on a divided unit basis.

DESCRIPTION OF EMBODIMENTS

Hereinafter, modes for carrying out the present invention (hereinafter referred to as "embodiments") will be described with reference to the drawings. In this embodiment, a description will be given of a technique by which an accumulated tolerance is corrected in an arrangement of terminal fittings of 200 poles, in particular, receptacle terminals (plate-shaped terminals). A technique that is applied to a cell-voltage detection connector used in a voltage detection device of a cell unit having a plurality of stacked cells is illustrated in this example. In general, the receptacle terminals of 200 poles are arranged with a risk that a trouble occurs in the terminal connection due to an accumulated tolerance. If a fitting work is forcedly conducted in that state, the receptacle terminals may be destroyed. For that reason, up to now, a configuration in which male terminal fittings are inserted into female terminal fittings in a lump has not been realized. However, in this embodiment, with the application of a terminal pitch tolerance correction housing for the purpose of enabling the lump insertion, the receptacle terminals (plate-shaped terminals) of 200 poles are buckled as occasion demands to correct the terminal pitch tolerance, thereby enabling the lump insertion. Further, the 200 poles are divided every 20 poles to suppress the accumulation of tolerances. Furthermore, an aligning structure is provided every divided 20 poles to suppress the accumulation of tolerance to each 20-pole unit. Also, in order to appropriately buckle the receptacle terminals, each receptacle terminal has a hole. When each hole is shaped into a substantially square, a stress exerted on the hole shape is appropriately dispersed when buckling, and the shape is adopted taking a break such as crack into account. Hereinafter, the above configuration will be described in detail.

Figure 1:
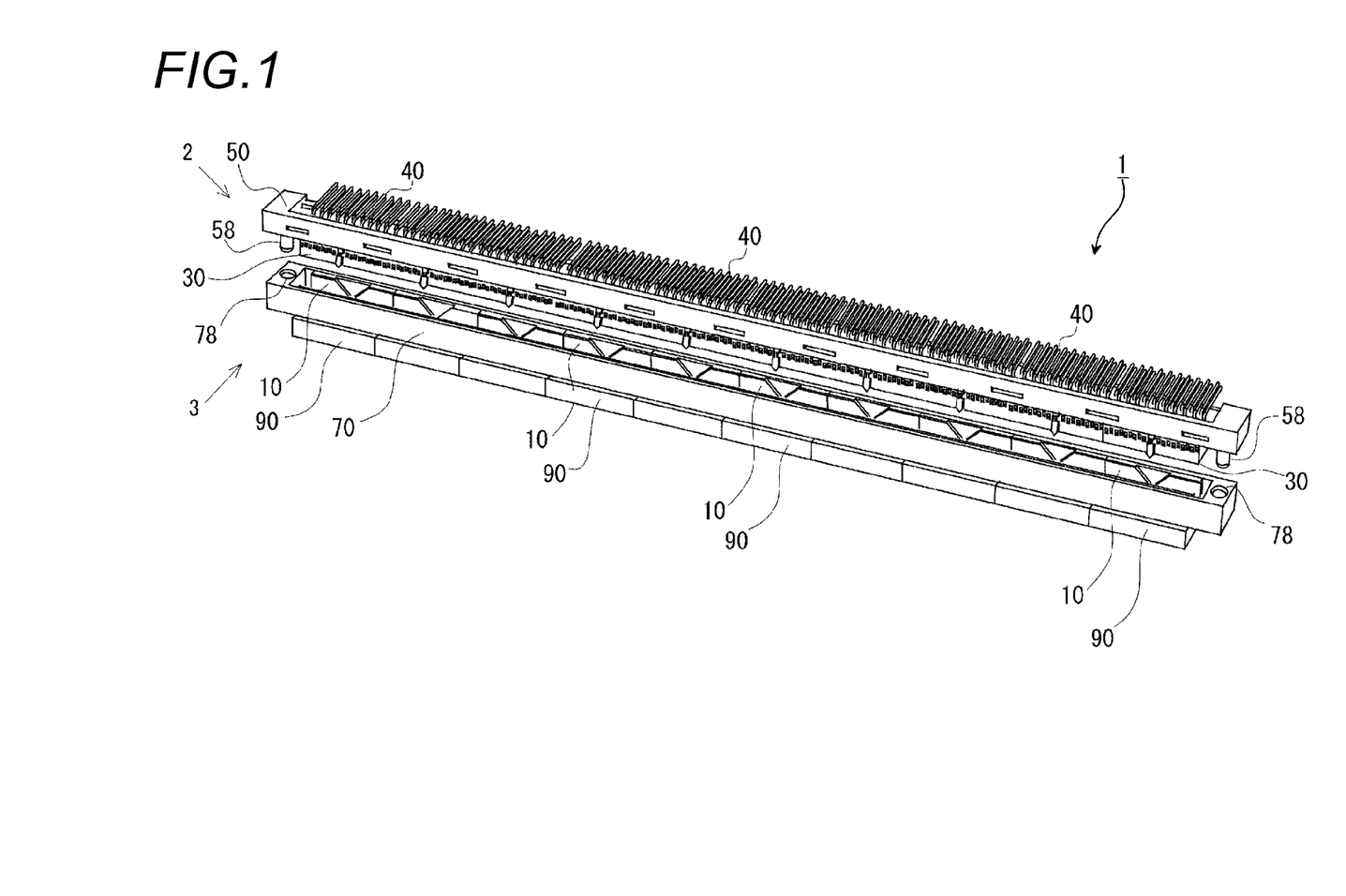
FIG. 1 is a perspective view illustrating a rough exterior of a connector set according to an embodiment of the present invention.
Figure 2:
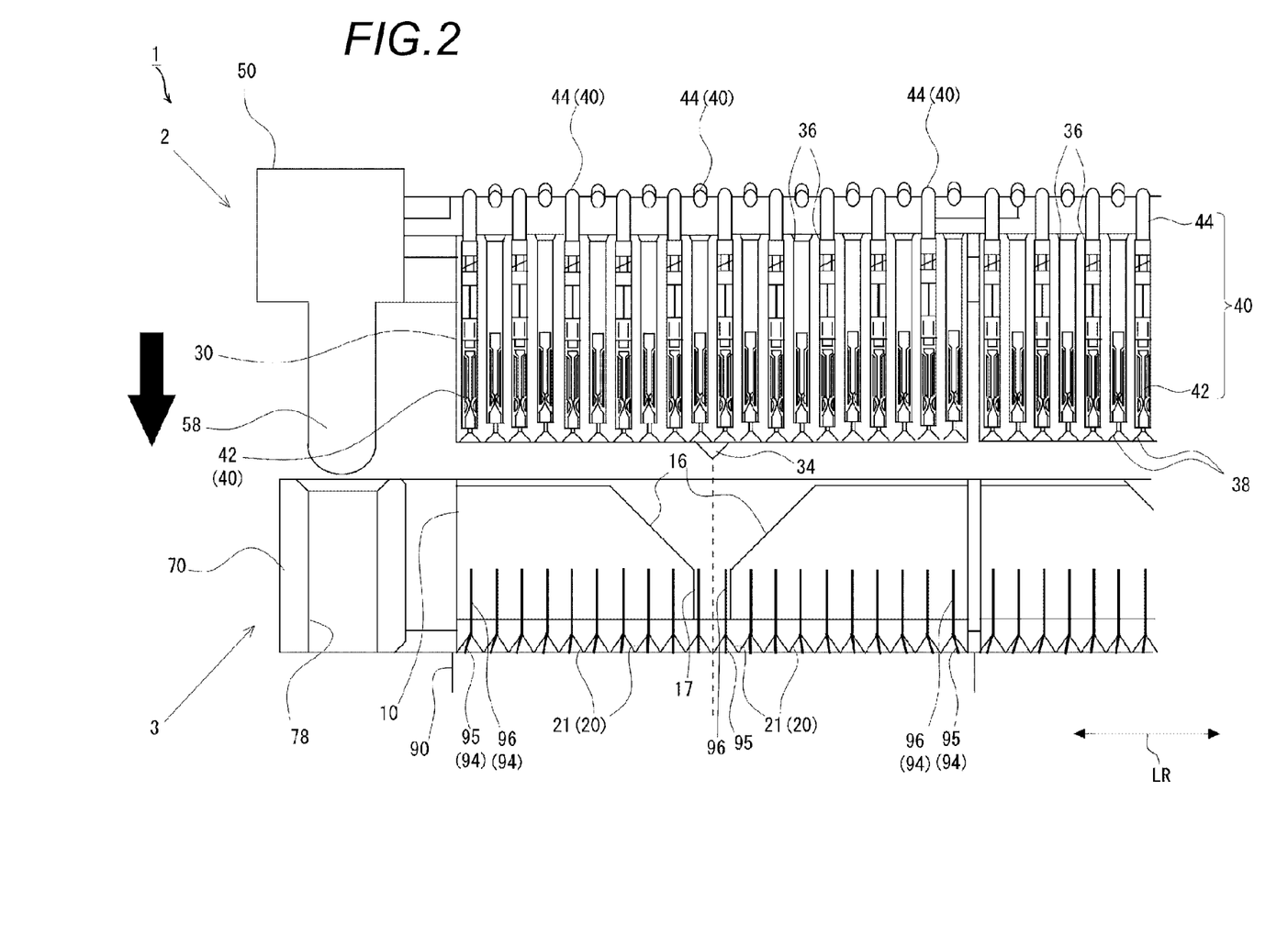
FIG. 2 is a diagram illustrating a part of a cross-sectional structure of the connector set according to the embodiment of the present invention.

FIG. 1 is a perspective view illustrating a rough exterior of a connector set 1 according to this embodiment. For convenience, this embodiment will be described assuming that a longitudinal direction of the connector set 1 is a horizontal direction (arrow LR in the figure), and a lateral direction thereof is an anteroposterior direction (arrow FR in the figure). FIG. 2 is a diagram illustrating a part of a cross-sectional structure of the connector set 1. The cross-sectional structure of FIG. 2 illustrates a part of the structure cut along a plane that separates an intermediate portion along a depth direction of FIG. 1 in the anteroposterior direction. In the subsequent figures, cross-sectional portions are illustrated with the omission of hatching if the drawings are complicated.

The connector set 1 functions as a cell-voltage detection connector, and includes an upper female unit 2 and a lower male unit 3 in the figure. When the female unit (female connector) 2 and the male unit (male connector) 3 are fitted to each other, fitting convexes 58 are fitted into fitting holes 78, which are disposed on both sides of those units, for positioning.

The female unit 2 is a component in which female terminals 40 are arranged, and the male unit 3 is a component in which receptacle terminals (plate-shaped terminals) 94 (refer to FIG. 2) connected to the female terminals are arranged. When the female unit 2 is appropriately fitted to the male unit 3, the lower receptacle terminals 94 are connected to the upper female terminals 40 in the figure. The respective constituent components of the female unit 2 and the male unit 3 are formed of resin moldings except for the female terminals 40 and the receptacle terminals 94. Therefore, in principle, no accumulated tolerance occurs. Also, the respective receptacle terminals 94 are protruded from a plurality of stacked cells. Accordingly, the stacked tolerance (accumulated tolerance) caused by stack of the respective cells is reflected by the position of the receptacle terminals 94.

Specifically, the female unit 2 includes the female terminals 40, female terminal housings (inner connectors) 30, and a female housing holder (holder) 50. The female unit 2 is configured to hold ten female terminal housings 30 with the female terminal housings 30 that accommodate the twenty female terminals 40 as one unit. That is, the female terminals 40 of 200 poles in total are accommodated therein. Also, the male unit 3 includes receptacle units (inner connectors) 90, and a terminal pitch tolerance correction housing (correction mechanism) 10. In more detail, with a set of the receptacle unit 90 integrally attached by inserting the receptacle terminals 94 into the receptacle unit 90 having the twenty receptacle terminals 94 as one unit (one set), ten sets are accommodated in a receptacle unit holder (holder) 70.

Figure 3:
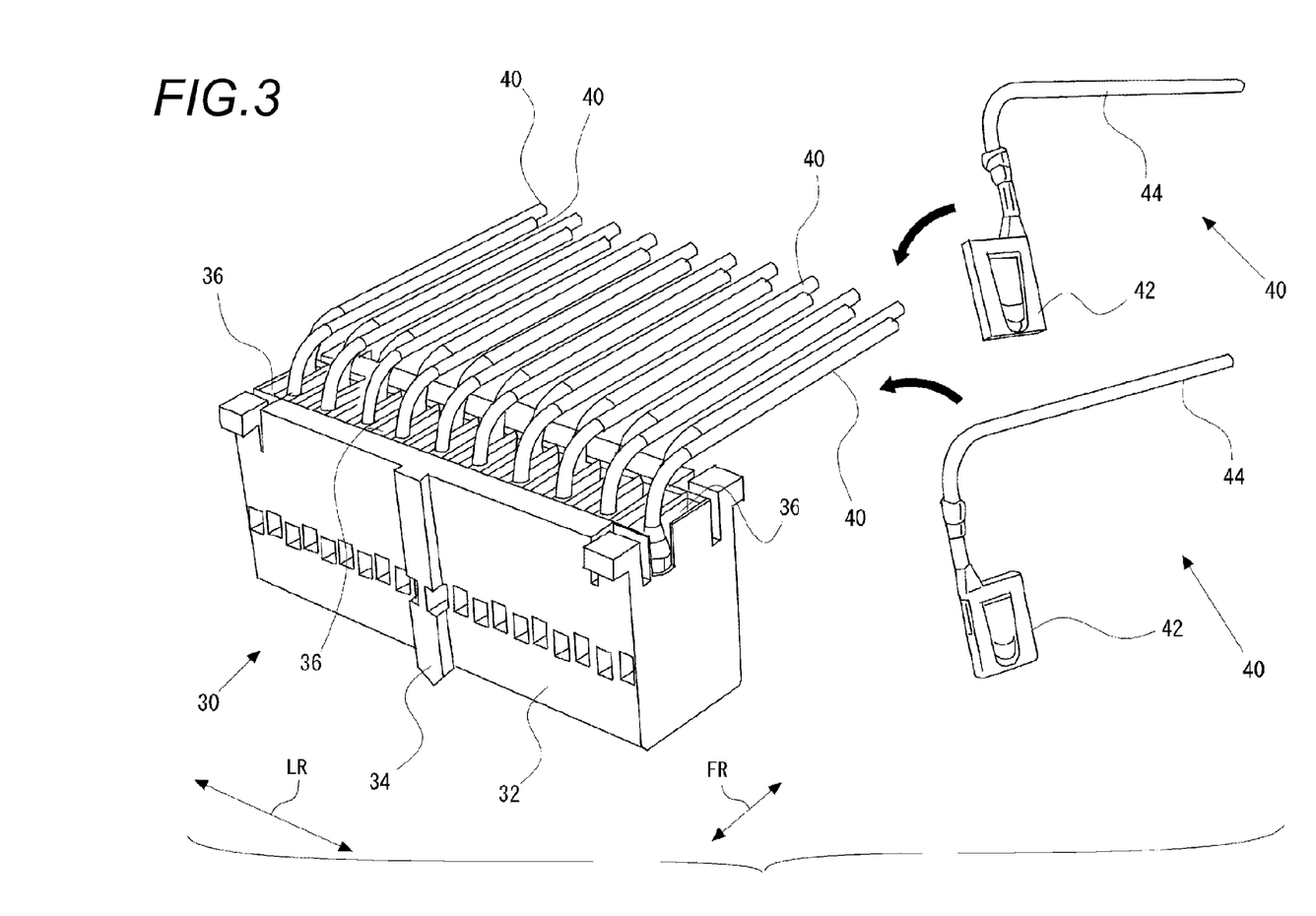
FIG. 3 is a diagram illustrating a female terminal housing and female terminals according to the embodiment of the present invention.

FIG. 3 illustrates the female terminal housings 30 and the female terminals 40. As illustrated in the figure, each of the female terminals 40 includes a terminal fitting 42, and a cable 44 connected to the terminal fitting 42. Each of the terminal fittings 42 has a general box-like shape, and has a function of inserting the plate-like receptacle terminals 94 into an interior of the terminal fitting 42 from a lower side thereof to hold a connection state.

Each of the female terminal housings 30 is equipped with twenty terminal accommodation units 36 in order to accommodate the twenty female terminals 40 (terminal fittings 42). The cross-sectional structure in a state where the female terminals 40 are accommodated in the respective terminal accommodation units 36 is illustrated in FIG. 2 described above. Each of the female terminals 40 is inserted into the terminal accommodation unit 36 from above, and held by the terminal accommodation unit 36. As illustrated in FIG. 2, guided openings (grooves) 38 are formed in lower sides of the terminal accommodation units 36 so that the receptacle terminals 94 which are the male terminals can be inserted into the terminal fittings 42. As illustrated in FIG. 3, the positions where the adjacent male terminals 40 are inserted into the terminal accommodation units 36 are alternately displaced back and forth, and accordingly, extended positions of the cables 44 from the terminal accommodation units 36 are alternated back and forth.

Also, an aligning protrusion 34 having a cross-sectional protrusion shape is formed on each of front and rear side surfaces of the female terminal housings 30 at a center position in the width direction. A lower end of the aligning protrusion 34 is triangular. The aligning protrusion 34 acts on guide parts 16 formed in the terminal pitch tolerance correction housing 10 of the male unit 3, and functions as a guide mechanism and a positioning mechanism (aligning mechanism) when the female unit 2 is fitted to the male unit 3. The specific fitting operation will be described later.

Figure 4:
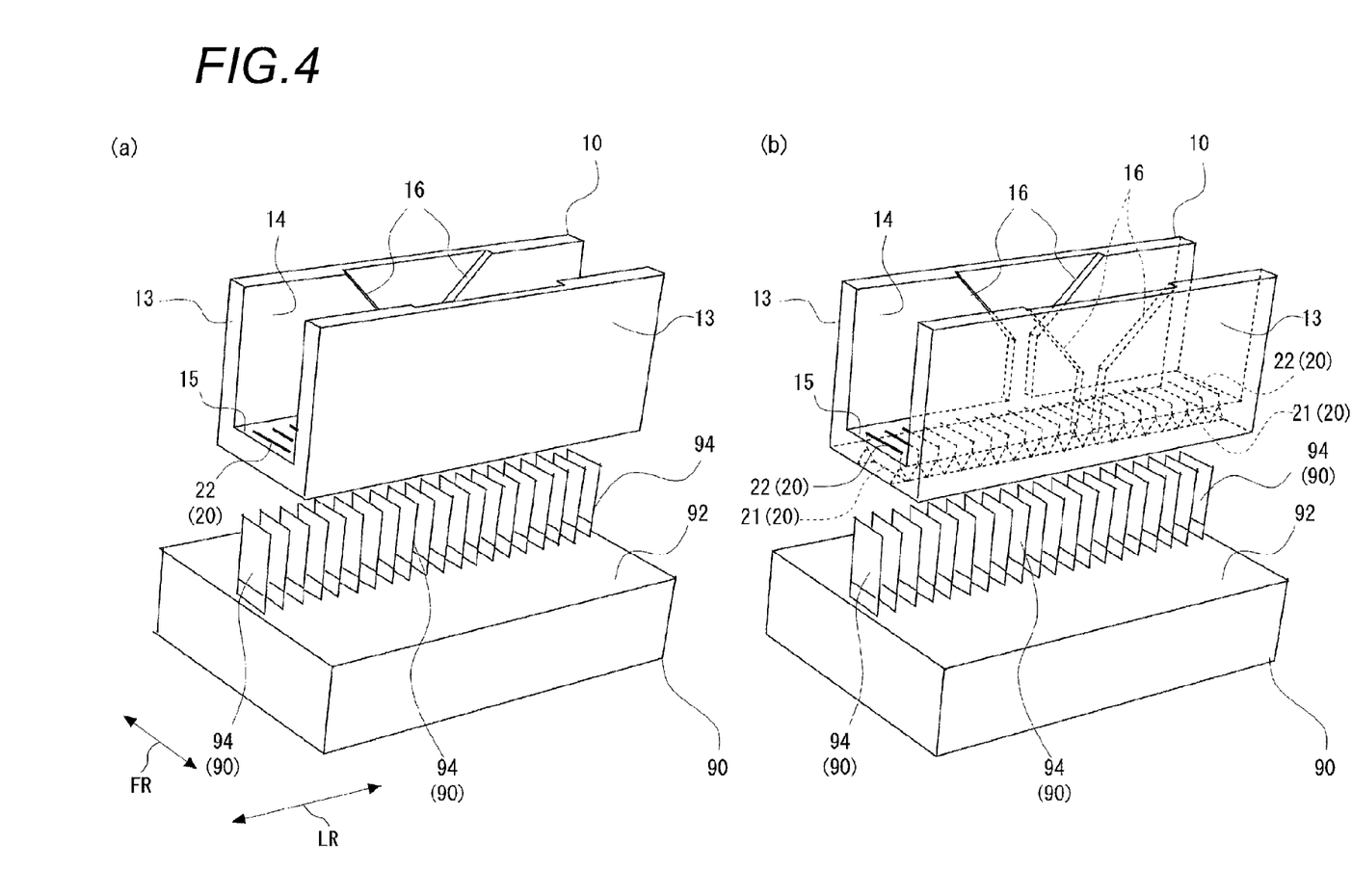
FIG. 4(a) is a perspective view illustrating a state in which a terminal pitch tolerance correction housing is separated from a receptacle unit according to the embodiment of the present invention.
FIG. 4(b) is a perspective view partially illustrating a portion hidden by a specific structure in this embodiment by broken lines in FIG. 4(a).
Figure 5:
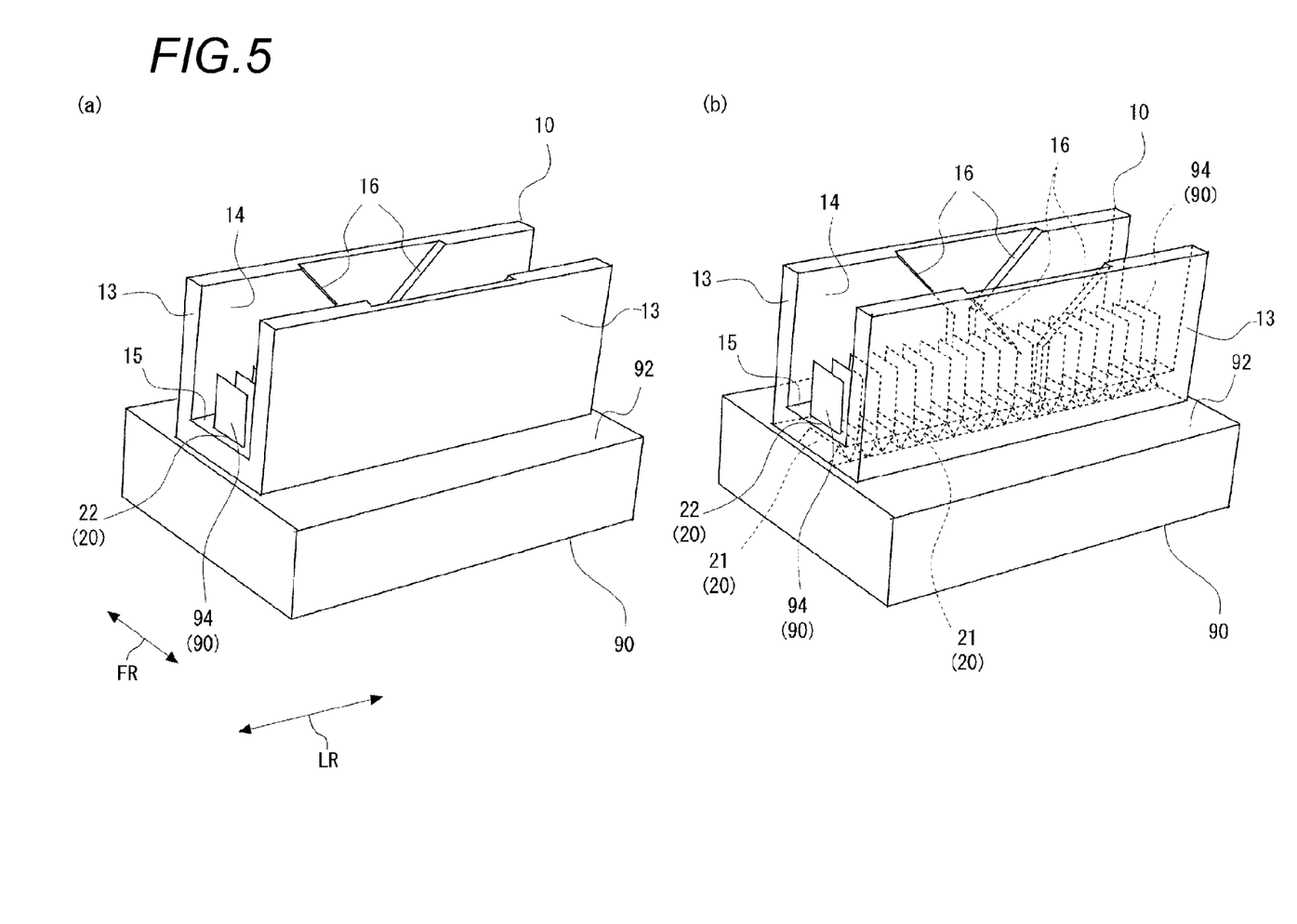
FIG. 5(a) is a perspective view illustrating a state in which the terminal pitch tolerance correction housing and the receptacle unit are assembled together according to the embodiment of the present invention.
FIG. 5(b) is a perspective view partially illustrating a portion hidden by the specific structure in this embodiment by broken lines in FIG. 5(a).
Figure 6:
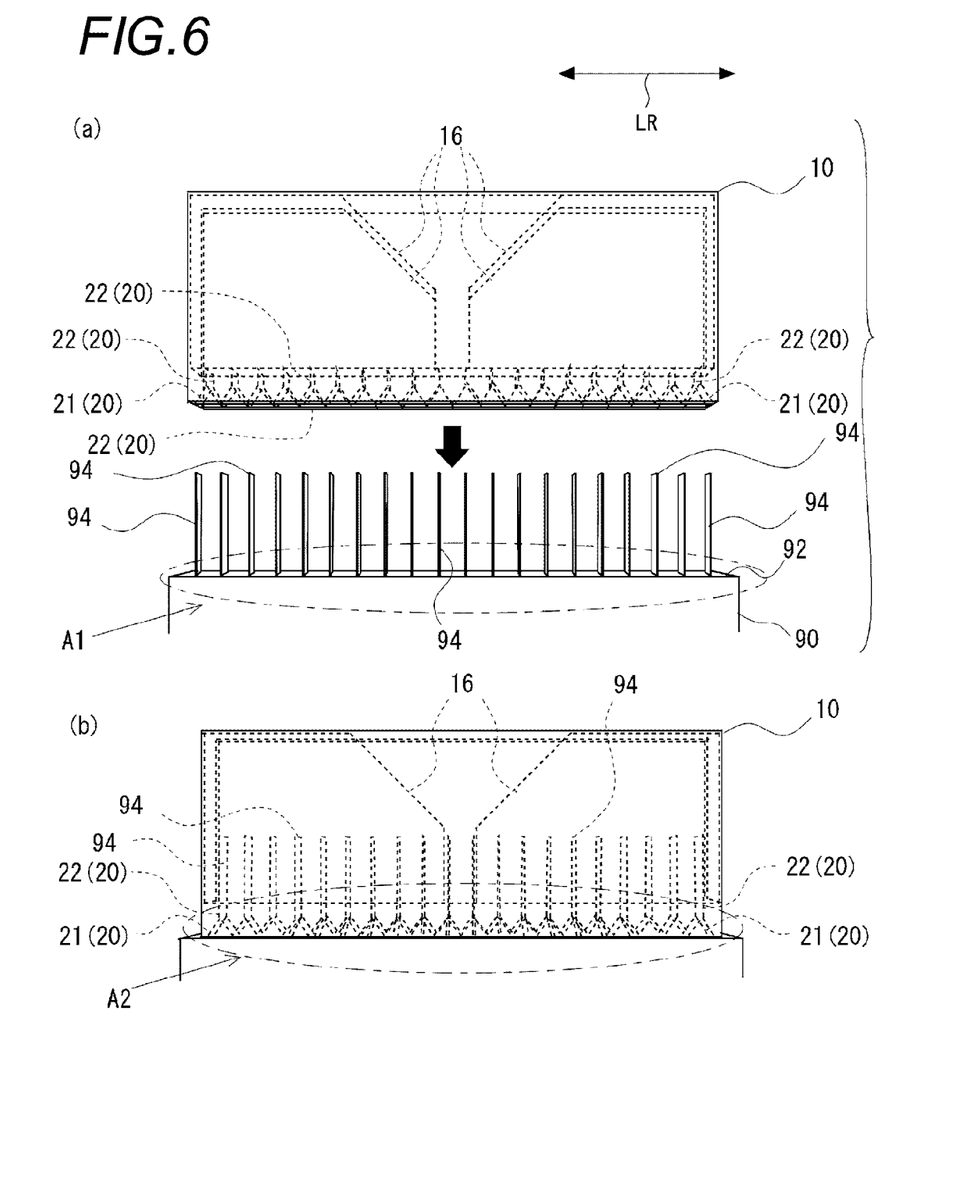
FIG. 6(a) is a front view illustrating a state in which the terminal pitch tolerance correction housing is separated from the receptacle unit according to the embodiment of the present invention.
FIG. 6(b) is a front view illustrating a state in which the terminal pitch tolerance correction housing and the receptacle unit are assembled together according to the embodiment of the present invention.
Figure 7:
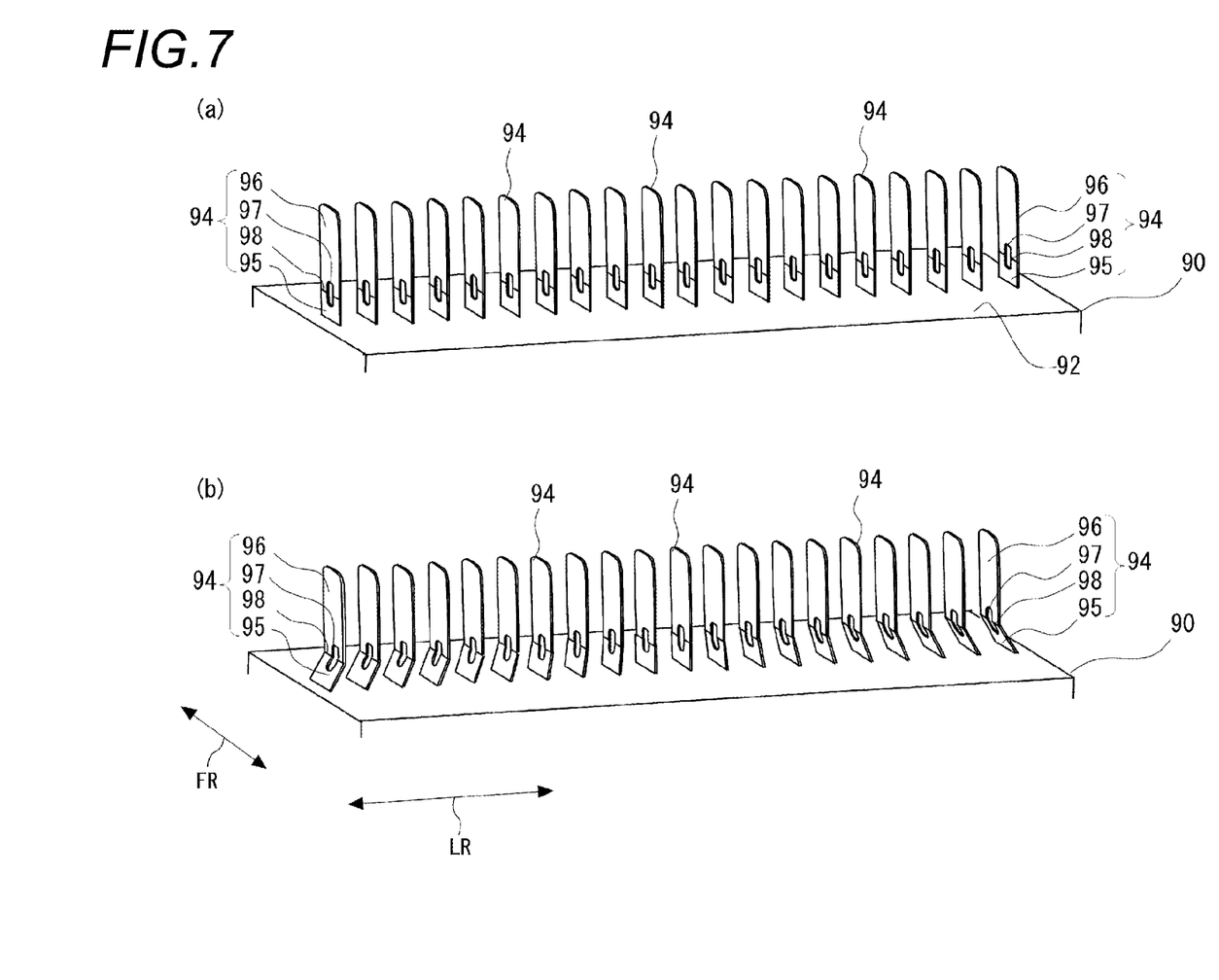
FIG. 7(a) is a diagram illustrating the receptacle terminals in which a partial area of FIG. 6(a) is enlarged according to the embodiment of the present invention.
FIG. 7(b) is a diagram illustrating the receptacle terminals in which a partial area of FIG. 6(b) is enlarged.

Subsequently, a description will be given of the terminal pitch tolerance correction housing 10 and the receptacle units 90 with reference to FIGS. 4(a) to 8. FIGS. 4(a) and 4(b) are perspective views illustrating a state in which the terminal pitch tolerance correction housing 10 and the receptacle units 90 are separated from each other. FIG. 4(a) is a perspective view of normal view, and FIG. 4(b) illustrates a portion hidden by a specific structure in this embodiment by broken lines in FIG. 4(a). FIGS. 5(a) and 5(b) illustrate a state in which the terminal pitch tolerance correction housing 10 and the receptacle unit 90 are assembled together in correspondence with FIGS. 4(a) and 4(b), respectively. Also, FIGS. 6(a) and 6(b) are front views illustrating a state in which the terminal pitch tolerance correction housing 10 is separated from the receptacle unit 90. Further, FIGS. 7(a) and 7(b) are perspective views focused on the receptacle units 90, in which FIG. 7(a) illustrates a state of the receptacle terminals 94 in a portion of an area A1 in FIG. 6(a), and FIG. 7(b) illustrates a state of the receptacle terminals 94 in a portion of an area A2 in FIG. 6(b).

Mainly as illustrated in FIGS. 7(a) and 7(b), in the receptacle unit 90, the receptacle terminals 94 that are conductive plate bodies (metal plates) of 20 poles face the adjacent receptacle terminals 94 on wide surfaces, and are aligned at given intervals on a base part 92.

Figure 9:
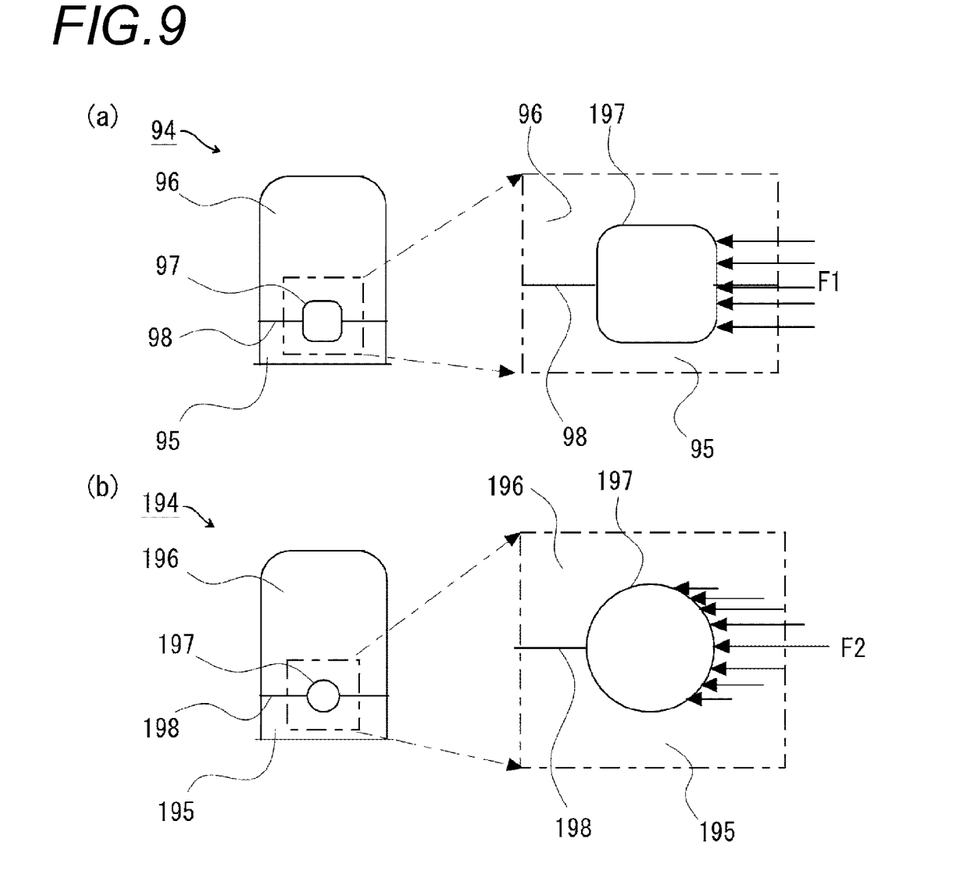
FIG. 9(a) is a diagram illustrating the receptacle terminal according to the embodiment of the present invention.
FIG. 9(b) is a diagram illustrating a receptacle terminal according to an embodiment of a comparative example.

FIG. 9(a) illustrates the receptacle terminal 94. As illustrated in FIGS. 9(a) and 7(a), each of the receptacle terminals 94 includes a receptacle root part 95 attached to the base part 92, and a receptacle front part 96 connected to the female terminal 40. The receptacle root part 95 and the receptacle front part 96 are separated in area by a mark-off part 98 and a bending hole (hole) 97. In more detail, the bending hole 97 is formed in a portion lower than a center of the wide surface of the receptacle terminal 94 in the vertical direction. The mark-off part 98 extends on both sides of the bending hole 97 up to ends in the horizontal direction (LR). The receptacle terminal 94 can be buckled (bent) at a portion of the bending hole 97 and the mark-off part 98 as a bendable part as occasion demands. That is, the receptacle terminals 94 are disposed so that the wide surfaces thereof face along a direction of stacking the plurality of cells, and can be deformed with bending along the stacking direction.

FIG. 9(b) illustrates a receptacle terminal 194 having a circular bending hole 197 according to an embodiment of a comparative example. As well as FIG. 9(a), a receptacle root part 195 and a receptacle front part 196 are separated in area by a mark-off part 198 and the bending hole 197. As illustrated in FIG. 9(b), when the circular bending hole 197 is circular, a stress may be concentrated so that a trouble such as crack occurs. Under the circumstances, as illustrated in FIG. 9(a), the bending hole 97 is shaped into a square so that the stress can be appropriately dispersed. That is, the receptacle terminal 94 is shaped so that the boundary is at a right angle to the bending direction (forming direction of mark-off part 98) so that stress can be dispersed.

Figure 8:
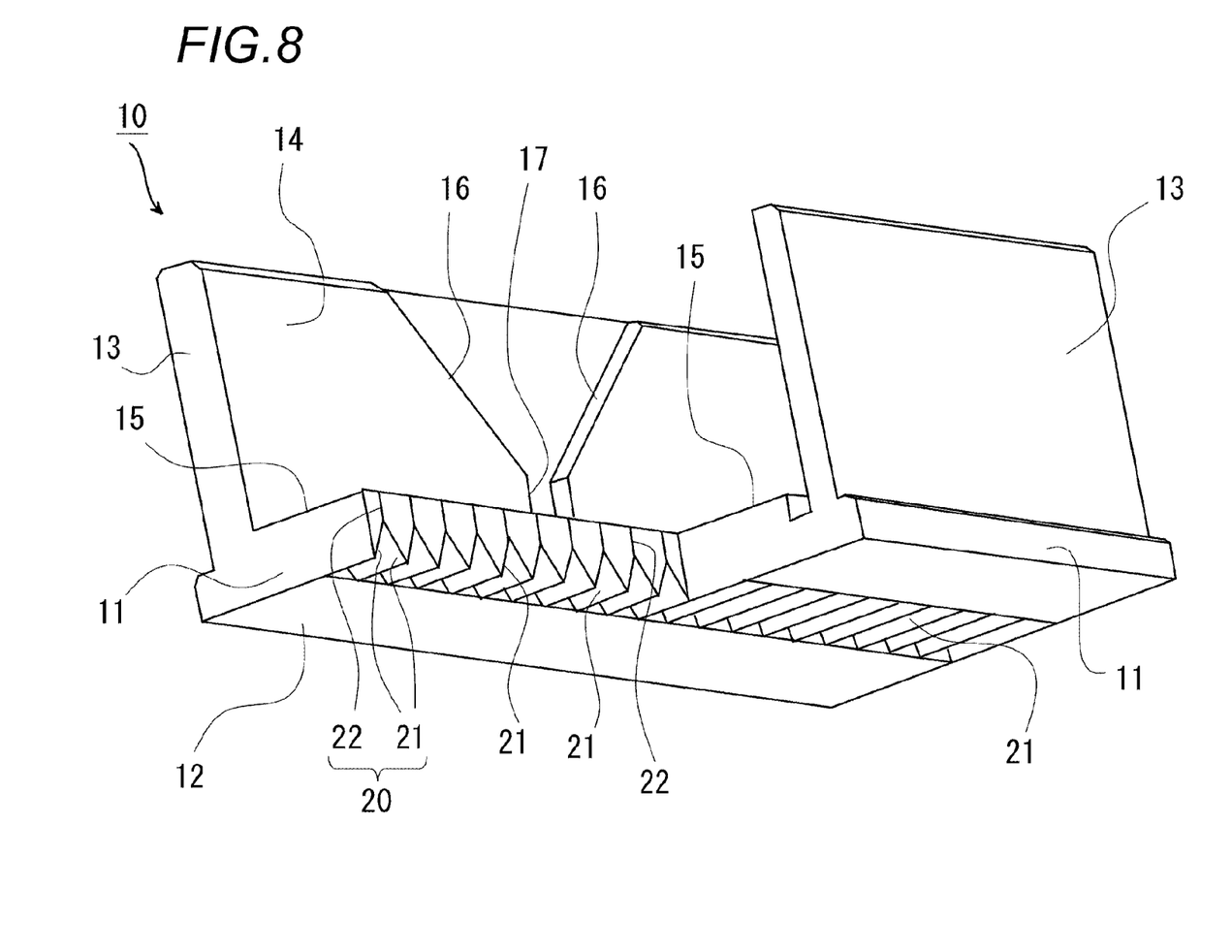
FIG. 8 is a perspective view illustrating the terminal pitch tolerance correction housing as a partial cross section in which a structure is partially removed for the purpose of facilitating to understand the shape of a receptacle arrangement part, according to the embodiment of the present invention.

FIG. 8 illustrates a perspective view of the terminal pitch tolerance correction housing 10 as a partial cross section in which a structure is partially removed for the purpose of facilitating to understand the shape of receptacle arrangement parts 20. The terminal pitch tolerance correction housing 10 is substantially U-shaped in cross section, and an upper side is opened. In more detail, the terminal pitch tolerance correction housing 10 includes a bottom 11, and front and rear side walls 13 extended from the bottom 11. No walls are disposed on both of right and left sides.

The guide parts 16 and an aligning fitting part 17 are continuously formed into a recess shape on a side wall inner surface 14 of each side wall 13. In detail, the aligning fitting part 17 is formed in the center of the side wall inner surface 14 in the horizontal direction so that a recess configuration having a given width is linearly extended upward from the bottom 11. The given width corresponds to a width of the aligning protrusion 34 of each female terminal housing 30. Also, a height of the aligning fitting part 17 is, for example, about ⅓ of the side wall 13. Further, a pair of the guide parts 16 is extended from an upper end of the aligning fitting part 17 so as to widen a distance therebetween toward an obliquely outward direction.

The twenty receptacle arrangement parts 20 for arranging the twenty receptacle terminals 94 at appropriate positions are formed in the bottom 11 of the terminal pitch tolerance correction housing 10. In detail, each of the receptacle arrangement parts 20 is shaped into a groove communicated in the bottom 11, and includes receptacle guide parts 21 and a receptacle insertion groove part 22.

The receptacle guide parts 21 are shaped into a groove having a triangular cross section and extending in the anteroposterior direction. In this example, a height of the receptacle guide parts 21 is about ½ of the thickness of the bottom 11, and a bottom of the triangle of the receptacle guide parts 21 is provided in a bottom outer surface 12 as an opening part. Accordingly, since the twenty receptacle guide parts 21 are continuously formed, the cross-sectional shape is saw teeth. Further, the receptacle insertion groove part 22 is so formed as to communicate vertically from an upper end (top of substantially triangular shape) of the receptacle guide parts 21 to a bottom inner surface 15. The receptacle insertion groove parts 22 for 20 poles are formed at given intervals.

When the receptacle units 90 illustrated in FIG. 7(a) are fitted to the terminal pitch tolerance correction housing 10, that is, when the respective receptacle terminals 94 are inserted into the receptacle insertion groove parts 22, even if the positions at which the receptacle terminals 94 are inserted into the receptacle insertion groove parts 22 are displaced due to the accumulation of tolerance, the receptacle front parts 96 of the receptacle terminals 94 are guided into the receptacle insertion groove parts 22 by the receptacle guide parts 21. Further, in a state illustrated in FIGS. 2 and 7(b), each of the receptacle terminals 94 is buckled at the portion of the bending hole 97 and the mark-off part 98 so as to be inserted into the receptacle insertion groove part 22, and protruded perpendicularly from the bottom inner surface 15. Because the accumulated tolerance of the receptacle terminals 94 in the horizontal direction (LR) is corrected by the buckling, the connection of the female terminal housings 30 with the female terminals 40 is ensured.

Subsequently, the fitting of the receptacle units 90 to the terminal pitch tolerance correction housing 10 will be described in detail mainly with reference to FIGS. 10(a) to 10(c).

Figure 10:
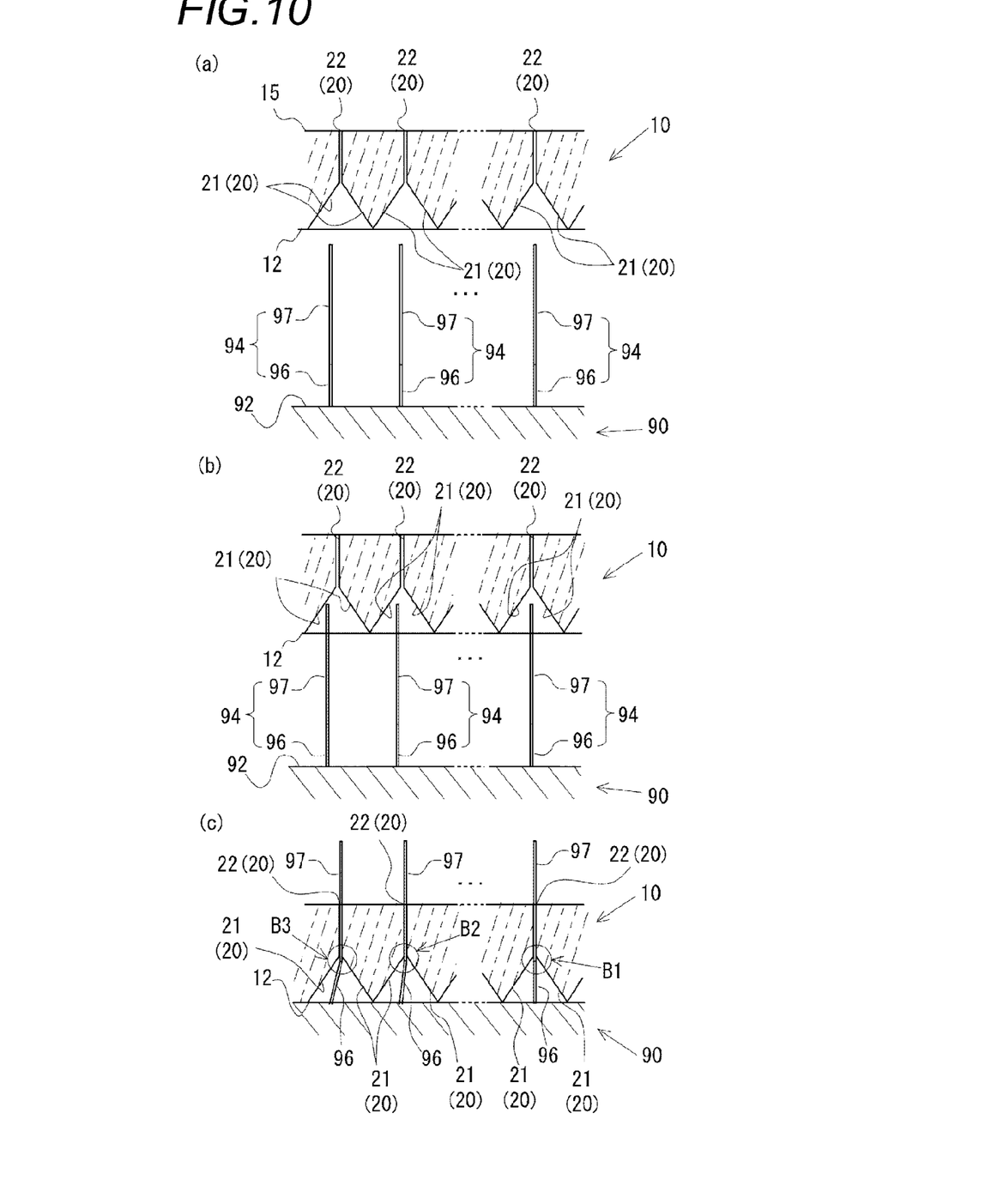
FIG. 10(a) is a diagram illustrating a state before the receptacle unit is coupled with the terminal pitch tolerance correction housing according to the embodiment of the present invention.
FIG. 10(b) is a diagram illustrating a state in which the terminal pitch tolerance correction housing is being coupled with the receptacle unit.
FIG. 10(c) is a diagram illustrating a state after the terminal pitch tolerance correction housing has been coupled with the receptacle unit.

FIG. 10(a) illustrates a state before the terminal pitch tolerance correction housing 10 and the receptacle unit 90 are coupled with each other, which corresponds to the state of FIG. 6(a). In the receptacle unit 90, among the receptacle terminals 94 fitted to the base part 92, the rightmost receptacle terminal 94 has no error (tolerance) of the fitting position in the figure, and the leftmost receptacle terminal 94 has the largest error (tolerance) of the fitting position.

FIG. 10(b) illustrates a state in which the terminal pitch tolerance correction housing 10 is being coupled with the receptacle unit 90. As described above, the left and middle receptacle terminals 94 are located at positions where those receptacle terminals 94 cannot be inserted directly into the receptacle insertion groove parts 22 because of the error of the fitting positions caused by the accumulated tolerance. In this state, the left receptacle terminal 94 is abutted against the receptacle guide part 21. On the other hand, the middle and right receptacle terminals 94 in the figure are not abutted against the receptacle guide part 21.

In this example, the receptacle guide parts 21 are formed obliquely toward the receptacle insertion groove part 22. Accordingly, when the terminal pitch tolerance correction housing 10 is moved toward the receptacle unit 90, the receptacle terminals 94 abutted against the receptacle guide parts 21 are directed toward the respective receptacle insertion groove parts 22 while being bent, by a force pushed against the receptacle guide parts 21.

When all of the receptacle terminals 94 are inserted into the receptacle insertion groove parts 22, as illustrated in FIGS. 10(c) and 7(b), each of the receptacle terminals 94 is buckled at the bending hole 97 and the mark-off part 98 formed as the boundary of the receptacle root part 95 and the receptacle front part 96. As described above, the receptacle insertion groove parts 22 are molded with resin in a state where there is substantially no tolerance. For that reason, when the terminal pitch tolerance correction housing 10 is fitted to the receptacle units 90, the receptacle terminals 94 (receptacle front parts 96) protruded from the receptacle insertion groove parts 22 toward the bottom inner surface 15 are corrected to a state where there is no tolerance. As a result, the female unit 2 and the male unit 3 are smoothly fitted to each other, and even if the female terminals 40 and the receptacle terminals 94 are connected to each other for the 200 poles in a lump, there occurs no trouble. As a result, an improvement in the work efficiency can be realized, and the false work (false assembling) associated with work for assembling the components one by one can be prevented.

The present invention has been described above on the basis of the above embodiment. The embodiment is given by way of example, those respective constituent elements and the combination thereof can be variously modified, and it is understood by an ordinary skilled person that the modified examples fall within the scope of the present invention. For example, in the above embodiment, the receptacle terminals 94 are bent, but may be deformed to be warped to correct the error. Also, each of the receptacle terminals 94 has both the bending hole 97 and the mark-off part 98 for bending. Alternatively, only any one of the bending hole 97 and the mark-off part 98 may be provided according to the characteristics of a material or an assumed magnitude of the stress, or the sizes of the bending hole 97 and the mark-off part 98 may be appropriately changed.

The present application is based on Japanese Patent Application No. 2010-215290 filed on Sep. 27, 2010, the contents of which are incorporated herein by reference.

INDUSTRIAL APPLICABILITY

According to the present invention, there can be provided the technique by which the accumulated tolerance caused by the arrangement of the terminal fittings is eliminated to improve the workability in the multipole cell-voltage detection connector.

REFERENCE SIGNS LIST

1: connector set (cell-voltage detection connector)
2: female unit (female connector)
3: male unit (male connector)
10: terminal pitch tolerance correction housing (correction mechanism)
11: bottom
13: side wall
16: guide part (aligning mechanism)
17: aligning fitting part (aligning mechanism)
20: receptacle arrangement part
21: receptacle guide part (guide part)
22: receptacle insertion groove part
30: female terminal housing (inner connector)

34: aligning protrusion (aligning mechanism)
36: terminal accommodation unit
40: female terminal
42: terminal fitting
50: female housing holder (holder)
70: receptacle unit holder (holder)
78: fitting hole
90: receptacle unit (inner connector)
94: receptacle terminal (plate-shaped terminal)
95: receptacle root part
96: receptacle front part
97: bending hole (bendable part)
98: mark-off part (bendable part)

The invention claimed is:

1. A cell-voltage detection connector, comprising:
a female connector in which a plurality of female terminals to be externally connected through respective electric wires are arranged; and
a male connector, that is assembled in a cell unit having a plurality of stacked cells, in which plate-shaped terminals protruded from the respective cells are arranged, wherein
the male connector and the female connector are fitted to each other to connect the female terminals and the plate-shaped terminals together,
the male connector includes a correction mechanism that is configured to deform the plate-shaped terminals to correct an accumulated tolerance caused by stack of the respective cells, said correction mechanism being slidably connected to the male connector, and
the correction mechanism includes:
a plurality of through-holes through which the plurality of plate-shaped terminals pass, and
guide parts, formed at ends of the plurality of through-holes, that are formed to be widened toward a first side of the correction mechanism where the plate-shaped terminals are inserted, opposed to a second side of the correction mechanism facing the female connector.

2. The cell-voltage detection connector according to claim 1, wherein
the plate-shaped terminals are disposed so that wide surfaces of the plate-shaped terminals face along a direction of stacking the plurality of cells, and each of the plate-shaped terminals includes a bendable part that can be deformed with bending along the stacking direction.

3. The cell-voltage detection connector according to claim 2, wherein
the bendable part includes a hole formed in each wide surface of the plate-shaped terminals.

4. The cell-voltage detection connector according to claim 1, wherein
each of the female connector and the male connector includes a plurality of inner connectors that is divided into units each having a given number of poles, and a holder that accommodates the plurality of inner connectors, and
the correction mechanism is provided in each divided inner connector of the male connector.

5. The cell-voltage detection connector according to claim 4, wherein
the male connector and the female connector include an aligning mechanism for positioning a fitting on a divided unit basis.

6. The cell-voltage detection connector according to claim 1, wherein at least one of the guide parts is shaped into a groove having a triangular cross section.

7. The cell-voltage detection connector according to claim 1, wherein at least one of the through-holes entirely extends along a longitudinal axis.

* * * * *